United States Patent
Gan

(10) Patent No.: US 10,477,363 B2
(45) Date of Patent: Nov. 12, 2019

(54) ESTIMATING WORKFORCE SKILL MISALIGNMENTS USING SOCIAL NETWORKS

(71) Applicant: Microsoft Technology Licensing, LLC, Redmond, WA (US)

(72) Inventor: Link Gan, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 637 days.

(21) Appl. No.: 15/193,342

(22) Filed: Jun. 27, 2016

(65) Prior Publication Data
US 2017/0091694 A1 Mar. 30, 2017

Related U.S. Application Data

(60) Provisional application No. 62/235,336, filed on Sep. 30, 2015.

(51) Int. Cl.
*H04W 4/00* (2018.01)
*H04W 4/21* (2018.01)
(Continued)

(52) U.S. Cl.
CPC ............ *H04W 4/21* (2018.02); *G06F 3/0482* (2013.01); *G06F 16/248* (2019.01);
(Continued)

(58) Field of Classification Search
None
See application file for complete search history.

(56) References Cited

U.S. PATENT DOCUMENTS

| 6,038,540 A | 3/2000 | Krist et al. |
| 6,408,337 B1 | 6/2002 | Dietz et al. |

(Continued)

FOREIGN PATENT DOCUMENTS

WO WO-2016160056 A1 10/2016

OTHER PUBLICATIONS

"U.S. Appl. No. 14/835,141, Non Final Office Action dated May 1, 2018", 37 pgs.

(Continued)

*Primary Examiner* — Gurkanwaljit Singh
(74) *Attorney, Agent, or Firm* — Schwegman Lundberg & Woessner, P.A.

(57) ABSTRACT

Estimation of workforce skill misalignments using social networks are described herein. A selection of geographical regions and a skill cluster is received from a computing device. For a respective geographical region, a respective supply for the selected skill cluster is calculated as a first respective standardized score corresponding to a first respective percentage of skilled members in the respective geographical region whose respective member profile indicates possession of the selected skill cluster. For a respective geographical region, a respective demand for the selected skill cluster is calculated as a second respective standardized score corresponding to a second respective percentage of job-switching members in the respective geographical region whose respective member profile indicates possession of the selected skill cluster. For a respective geographical region, a respective skills misalignment for the selected skill cluster is calculated as the respective difference between the respective demand and the respective supply.

24 Claims, 9 Drawing Sheets

(51) Int. Cl.
  *G06Q 10/06* (2012.01)
  *H04L 29/08* (2006.01)
  *G06F 3/0482* (2013.01)
  *G06F 16/9535* (2019.01)
  *G06F 16/248* (2019.01)
  *G06N 20/00* (2019.01)
  *G06N 5/02* (2006.01)
  *H04W 4/021* (2018.01)
  *G06Q 50/00* (2012.01)
  *G05B 19/418* (2006.01)

(52) U.S. Cl.
  CPC ......... *G06F 16/9535* (2019.01); *G06N 5/022* (2013.01); *G06N 20/00* (2019.01); *G06Q 10/063112* (2013.01); *H04L 67/306* (2013.01); *H04W 4/021* (2013.01); *G05B 19/418* (2013.01); *G06Q 50/01* (2013.01)

(56) References Cited

U.S. PATENT DOCUMENTS

| | | | |
|---|---|---|---|
| 6,631,354 B1 | 10/2003 | Leymann et al. | |
| 7,222,082 B1 | 5/2007 | Adhikari et al. | |
| 8,271,531 B2 | 9/2012 | Karlsen et al. | |
| 8,689,108 B1 | 4/2014 | Duffield et al. | |
| 9,305,287 B2* | 4/2016 | Krishnamoorthy | G06Q 30/02 |
| 9,405,799 B1 | 8/2016 | Kapoor et al. | |
| 9,454,576 B1 | 9/2016 | Kapoor et al. | |
| 9,734,040 B2 | 8/2017 | Gounares | |
| 9,734,486 B2 | 8/2017 | Blaum et al. | |
| 9,756,006 B2 | 9/2017 | Shapero et al. | |
| 9,785,317 B2 | 10/2017 | Duffield et al. | |
| 9,794,167 B2 | 10/2017 | Thubert et al. | |
| 9,832,273 B2 | 11/2017 | Mencke | |
| 9,886,522 B2 | 2/2018 | Zhang et al. | |
| 2003/0046120 A1 | 3/2003 | Hoffman et al. | |
| 2004/0162748 A1* | 8/2004 | Vogel | G06Q 10/06 705/7.13 |
| 2004/0162749 A1* | 8/2004 | Vogel | G06Q 10/06 705/7.18 |
| 2004/0162753 A1* | 8/2004 | Vogel | G06Q 10/06 705/7.14 |
| 2006/0074727 A1 | 4/2006 | Briere | |
| 2006/0229896 A1 | 10/2006 | Rosen et al. | |
| 2007/0198322 A1 | 8/2007 | Bourne et al. | |
| 2007/0198323 A1 | 8/2007 | Bourne et al. | |
| 2007/0206768 A1 | 9/2007 | Bourne et al. | |
| 2007/0299743 A1 | 12/2007 | Staib et al. | |
| 2008/0004922 A1 | 1/2008 | Eder | |
| 2008/0004941 A1 | 1/2008 | Calabria | |
| 2008/0167929 A1* | 7/2008 | Cao | G06Q 10/06 705/7.11 |
| 2008/0167930 A1* | 7/2008 | Cao | G06Q 10/06 705/7.14 |
| 2008/0208654 A1 | 8/2008 | Nahikian et al. | |
| 2009/0063545 A1 | 3/2009 | Hsu et al. | |
| 2009/0171720 A1 | 7/2009 | Crook et al. | |
| 2009/0198562 A1 | 8/2009 | Wiesinger et al. | |
| 2009/0276209 A1* | 11/2009 | Dane | G06F 17/271 704/9 |
| 2009/0299785 A1 | 12/2009 | Savjani et al. | |
| 2009/0319345 A1 | 12/2009 | Lin et al. | |
| 2009/0326995 A1 | 12/2009 | Sorisi et al. | |
| 2009/0327375 A1 | 12/2009 | Paknad et al. | |
| 2010/0233663 A1* | 9/2010 | Pennington | G09B 19/00 434/219 |
| 2010/0313157 A1 | 12/2010 | Carlsson et al. | |
| 2011/0054973 A1 | 3/2011 | Deich et al. | |
| 2011/0082803 A1 | 4/2011 | Kowa et al. | |
| 2011/0307401 A1 | 12/2011 | Altman | |
| 2012/0072253 A1 | 3/2012 | Ritter et al. | |
| 2012/0197993 A1 | 8/2012 | Skomoroch et al. | |
| 2012/0313948 A1 | 12/2012 | Bergman et al. | |
| 2013/0097253 A1 | 4/2013 | Mencke | |
| 2013/0184838 A1 | 7/2013 | Tchoryk, Jr. et al. | |
| 2013/0208880 A1 | 8/2013 | Lovy et al. | |
| 2013/0232171 A1 | 9/2013 | Cheng et al. | |
| 2013/0254213 A1 | 9/2013 | Cheng et al. | |
| 2013/0254305 A1 | 9/2013 | Cheng et al. | |
| 2013/0268373 A1 | 10/2013 | Grishaver | |
| 2014/0013309 A1 | 1/2014 | Gounares | |
| 2014/0040182 A1 | 2/2014 | Gilder et al. | |
| 2014/0081928 A1 | 3/2014 | Skomoroch et al. | |
| 2014/0164362 A1 | 6/2014 | Syed et al. | |
| 2014/0189651 A1 | 7/2014 | Gounares | |
| 2014/0189652 A1 | 7/2014 | Gounares | |
| 2014/0214941 A1 | 7/2014 | Shapero et al. | |
| 2014/0214943 A1 | 7/2014 | Shapero et al. | |
| 2014/0214945 A1 | 7/2014 | Zhang et al. | |
| 2014/0279632 A1 | 9/2014 | Andersen et al. | |
| 2014/0297642 A1 | 10/2014 | Lum et al. | |
| 2014/0297837 A1 | 10/2014 | Agarwal et al. | |
| 2014/0372329 A1 | 12/2014 | Menon et al. | |
| 2015/0006214 A1 | 1/2015 | Lavoie et al. | |
| 2015/0046355 A1 | 2/2015 | Blaum et al. | |
| 2015/0046356 A1 | 2/2015 | Millmore et al. | |
| 2015/0088798 A1 | 3/2015 | Ghosh et al. | |
| 2015/0089424 A1 | 3/2015 | Duffield et al. | |
| 2015/0127650 A1 | 5/2015 | Carlsson et al. | |
| 2015/0161566 A1 | 6/2015 | Cai | |
| 2015/0186817 A1 | 7/2015 | Kim et al. | |
| 2015/0201078 A1 | 7/2015 | Khouri et al. | |
| 2015/0213463 A1 | 7/2015 | Turner et al. | |
| 2015/0235143 A1 | 8/2015 | Eder | |
| 2015/0254370 A1 | 9/2015 | Sexton et al. | |
| 2015/0269244 A1 | 9/2015 | Qamar et al. | |
| 2015/0294248 A1 | 10/2015 | Deibler | |
| 2015/0302328 A1 | 10/2015 | Zeng et al. | |
| 2015/0317376 A1 | 11/2015 | Bauer et al. | |
| 2015/0317759 A1 | 11/2015 | Jing et al. | |
| 2015/0324724 A1 | 11/2015 | Dasgupta et al. | |
| 2015/0379535 A1 | 12/2015 | Wang et al. | |
| 2016/0026939 A1 | 1/2016 | Schiffer et al. | |
| 2016/0034561 A1 | 2/2016 | Sexton et al. | |
| 2016/0148404 A1 | 5/2016 | Ahne et al. | |
| 2016/0180264 A1 | 6/2016 | Beck et al. | |
| 2016/0292642 A1 | 10/2016 | Sethi et al. | |
| 2016/0314418 A1 | 10/2016 | Varghese et al. | |
| 2016/0321583 A1 | 11/2016 | Jones et al. | |
| 2017/0061456 A1 | 3/2017 | Feng et al. | |
| 2017/0069037 A1 | 3/2017 | Ahn | |

OTHER PUBLICATIONS

"International Application Serial No. PCT/US2015/053001, International Preliminary Report on Patentability dated Oct. 12, 2017", 6 pgs.
"U.S. Appl. No. 14/755,778, Examiner Interview Summary dated Feb. 10, 2016", 3 pgs.
"U.S. Appl. No. 14/755,778, Final Office Action dated Mar. 9, 2016", 7 pgs.
"U.S. Appl. No. 14/755,778, Non-Final Office Action Received—PE", 9 pgs.
"U.S. Appl. No. 14/755,778, Response filed Feb. 10, 2016 to Non-Final Office Action—PE", 26 pgs.
"U.S. Appl. No. 14/755,778, Response filed Jul. 11, 2016 to Final Office Action dated Mar. 9, 2016", 14 pgs.
"U.S. Appl. No. 14/845,483, Preliminary Amendment filed Sep. 15, 2015", 3 pgs.
"International Application Serial No. PCT/US2015/053001, International Search Report dated Jan. 4, 2016", 2 pgs.
"International Application Serial No. PCT/US2015/053001, Written Opinion dated Jan. 4, 2016", 4 pgs.
Carlson School of Management, et al., "Tech Cities 2015", http://carlsonschool.umn.edu/events/techcitiesconference/pastconferences/techcities2015#insidelinkedin (last visited (Aug. 24, 2015).
"U.S. Appl. No. 14/755,778, Final Office Action dated Apr. 18, 2017" 12 pgs.

(56) References Cited

OTHER PUBLICATIONS

"U.S. Appl. No. 14/755,778, Non Final Office Action dated Jan. 12, 2017", 11 pgs.
"U.S. Appl. No. 14/755,778, Response filed Mar. 6, 2017 to Non Final Office Action dated Jan. 12, 2017", 15 pgs.
"Final Office Action Issued in U.S. Appl. No. 14/835,141", dated Jan. 22, 2019, 53 Pages.
"Applicant Initiated Interview Summary Issued in U.S. Appl. No. 14/845,483", dated Dec. 10, 2018, 3 Pages.
"Final Office Action Issued in U.S. Appl. No. 14/845,483", dated May 17, 2019, 19 Pages.
"Non Final Office Action Issued in U.S. Appl. No. 14/845,483", dated Sep. 5, 2018, 14 Pages.

* cited by examiner

ESTIMATING WORKFORCE SKILL MISALIGNMENTS USING SOCIAL NETWORKS

CLAIM OF PRIORITY AND RELATED APPLICATIONS

This patent application claims the benefit of priority under 35 U.S.C. § 119(e) to U.S. Provisional Patent Application Ser. No. 62/235,336, filed on Sep. 30, 2015, entitled, "ESTIMATING WORKFORCE SKILL GAPS USING SOCIAL NETWORKS," which is hereby incorporated by reference herein in its entirety. This patent application is related to U.S. patent application Ser. No. 14/755,778, filed on Jun. 30, 2015, entitled, "ESTIMATING WORKFORCE SKILL GAPS USING SOCIAL NETWORKS," and is related to U.S. Provisional Patent Application Ser. No. 62/141,253, filed on Mar. 31, 2015, entitled, "ESTIMATING WORKFORCE SKILL GAPS USING SOCIAL NETWORKS," both of which are hereby incorporated by reference herein in their entireties.

TECHNICAL FIELD

The present disclosure generally relates to social networks hosting member profiles and job postings and, in some embodiments, to techniques for estimating workforce skill misalignments using social networks.

BACKGROUND

A social network service is a computer or web-based application that enables users to establish links or connections with persons for sharing information with one another. Some social networks aim to enable friends and family to communicate with one another, while others are specifically directed to business users with a goal of enabling the sharing of business information.

BRIEF DESCRIPTION OF THE DRAWINGS

Some embodiments are illustrated by way of example and not limitation in the figures of the accompanying drawings.

DETAILED DESCRIPTION

Figure 1:
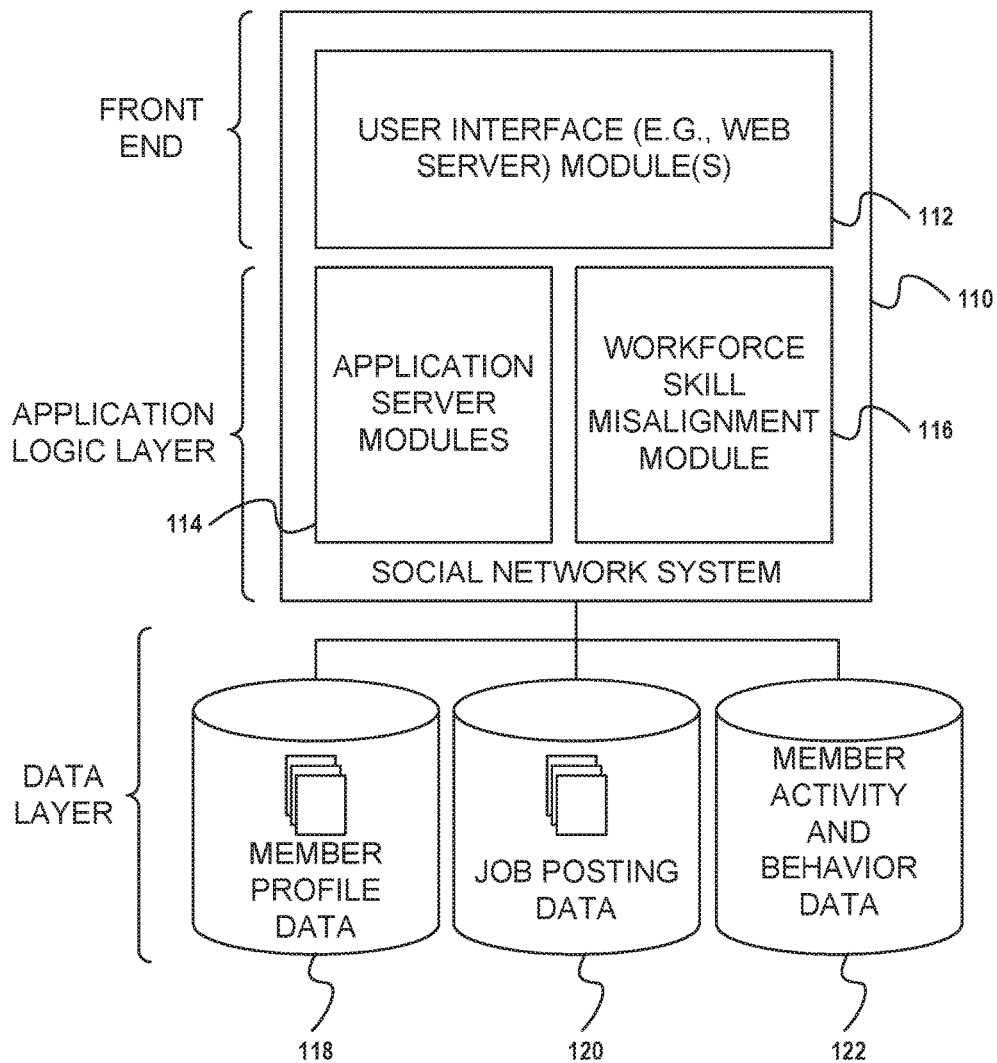
FIG. 1 is a block diagram showing the functional components of a social network service, including a workforce skill misalignment module for estimating workforce skill misalignments within one or more geographical regions of interest, according to an example embodiment.

The present disclosure describes methods, systems, and computer program products, each of which provides estimation of workforce skill misalignments, for a geographical region of interest, using a social network service. "Skills misalignment" (or "skills gap") is a term that describes a disparity between those skills needed for a job and those skills possessed by prospective workers. Existing formal methodologies for quantifying a "skills misalignment" are either insufficient or are too convoluted. For example, quantifying skills of a labor pool, at either micro or macro levels, has proven to be extremely difficult at any level of geography (e.g., continent, a country, a state, a county, a city, a neighborhood, etc.) Skill misalignments may be estimated by government agencies by manually collecting employment data from households through periodic censuses; this is a time and resource-consuming process. Educational data from the Current Population Survey ("CPS"), which is sponsored jointly by the U.S. Census Bureau and the U.S. Bureau of Labor Statistics ("BLS"), may be used by economic and workforce developers as a proxy for "skill level." This often results in oversimplifying the skills required for a job, as educational data is not necessarily correlated with skills. A more costly, yet stilt aggregate measure of "skill" is often determined by surveying employers about the types of skills misalignments that they encounter in either incumbent or prospective employees.

Some employment initiatives, based on findings of indirect measures of "skills," "skills gaps," and "skills misalignments" invest precious time and resources in promoting "skills" that are not needed by employers. Thus, a balanced approach is needed for "skills misalignment" estimation that incorporates rigorous quantitative methods, uses a direct measure of skills, and has practical application for workforce policy.

Disclosed in some examples herein are methods, systems, and machine-readable mediums, in which asocial network service may be used to estimate workforce skill misalignments. For a given geographical area, the skills possessed by those members within that geographical area are a good proxy for the skills available within that geographical area. The location and skills of a member may be determined by the member's profile on the social networking service. In some embodiments, each member profile on the social networking service lists zero or more geographical locations for the member. For example, a member's profile may list the member's current primary residence, the primary geographical location(s) of the member's current employment position, a list of the member's previous primary residences, a list of geographical locations where the member wishes to visit and/or live, etc. These locations may be listed at varying levels of specificity, from as specific as GPS coordinates (e.g., 41°56'54"N 87°39'20"W) to as general as the name of a continent (e.g., "Africa".)

For a given geographical area, the workforce demand may be measured in various ways, each having its advantages and disadvantages. BLS uses "job fluidity," which is the frequency with which workers in a region switched jobs, as a measure of workforce demand. On a social networking service, a member who has switched jobs may be identified by changes in the member's profile that indicate (or explicitly state) that the member switched jobs. In an embodiment, a member is considered to have switched jobs if a position listed on the member's profile is with a different employer than the employer for the next chronological position listed on the member's profile. Workforce demand for a given geographical region may be measured using a social networking service by determining how many members switched jobs in the region within a period of time (e.g., the most recent 12 months).

Upon measuring workforce demand and workforce supply for a set of geographical regions, the results may be compared and transmitted to a computing device to be displayed to a user. Comparing workforce demand vs. workforce supply amongst geographic regions may provide several benefits, including, but not limited to:

1. Informing education/training policy for governments and educational institutions to reduce skills misalignments in certain geographies/segments of the population having an undersupply of talent;

2. Encouraging employers to take advantage of local skills surpluses, for example by enabling local leaders with information to persuade non-local employers to invest in operations that leverage the excess local talent;

3. Facilitating better matching for employers by surfacing jobs and relevant opportunities to members based on the skill requirements of a job and the relevant skill(s) the members currently possess;

4. Inform migration policy for members and governments by encouraging the free flow of skills supply from regions of skills surpluses to regions of skills shortages; and 5. Inform members' self-investment decisions by highlighting in-demand skills to members to help them understand ways to self-educate and up-skill.

FIG. 1 is a block diagram 100 showing the functional components of a social network service, including a workforce skill misalignment module 116 for estimating workforce skill misalignments within one or more geographical regions of interest, according to an example embodiment.

As shown in FIG. 1, the front end consists of a user interface module (e.g., a web server) 112, which receives requests from various client-computing devices, and communicates appropriate responses to the requesting client devices. For example, the user interface module(s) 112 may receive requests in the form of Hypertext Transport Protocol (HTTP) requests, or other web-based, application programming interface (API) requests. The application logic layer includes various application server modules 114, which, in conjunction with the user interface module(s) 112, generates various user interfaces (e.g., web pages) with data retrieved from various data sources in the data layer.

In some embodiments, individual application server modules 114 are used to implement the functionality associated with various applications and/or services provided by the social network service. For example, in some embodiments, the social network service may provide an application or service that allows companies and/or people to post information about available job openings—such information generally referred to as a job posting or job listing. This job posting data is stored in job posting database 120. Accordingly, members of the social network service may search for and view available job postings. Job postings may be presented in a content module displayed on some portion of a web page or on a user interface of a mobile device (e.g., phone or tablet computing device). As members interact with the content associated with the job postings, the interactions are detected and logged in member activity and behavior database 122. Accordingly, the nature of the interactions may be used as input data for the workforce skill misalignment module 116 that estimates workforce skill misalignments for a geographical region of interest.

As shown in FIG. 1, the data layer includes several databases, such as a database 118 for storing member profile data. Consistent with some embodiments, when a person initially registers to become a member of the social network service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database with reference number 118. In some embodiments, the profile data may be processed (e.g., in the background or offline) to generate various derived profile data.

Once registered, a member may invite other members, or be invited by other members, to connect via the social network service. A "connection" may require a bi-lateral agreement by the members, such that both members acknowledge the establishment of the connection. In any case, the various associations and relationships that the members establish with other members, or with other entities and objects, are stored and maintained within the member activity and behavior database 122.

As members interact with the various applications, services, and content made available via the social network service, the members' behavior (e.g., content viewed, links or buttons selected, messages responded to, etc.) may be tracked and information concerning the member's activities and behavior may be logged or stored, for example, as indicated in FIG. 1 by the database with reference number 122. This information may be used to classify the member as being in various classifications or categories. Furthermore, each time a member views an electronic job posting, a link between the member's profile data (which is stored in database 118) and the electronic job posting (which is stored in job posting database 120) is recorded in member activity and behavior database 122.

As illustrated in FIG. 1, the social network system includes what is referred to as a workforce skill misalignment module 116. The workforce skill misalignment module 116 receives, as input, data from any one or more of the databases 118, 120, and 122, and derives for one or more selected regions of interest, an estimation of the workforce skills misalignment for the region(s). The operation of the workforce skill misalignment module 116 is described in greater detail below in connection with the descriptions of FIGS. 4-8.

Although not shown, in some embodiments, the social network system 110 provides an application programming interface (API) module, via which applications and services may access various data and services provided or maintained by the social network service. Such applications may be browser-based applications, or may be operating system-specific. In particular, some applications may reside and execute on one or more mobile devices (e.g., smartphone, or tablet computing devices with a mobile operating system. Furthermore, while in many cases the applications or services that leverage the API may be applications and services that are developed and maintained by the entity operating the social network service, in some embodiments, the API is provided to the public or to certain third-parties under special arrangements, thereby making the workforce skill misalignment estimation services available to third party applications and services.

Figure 2:
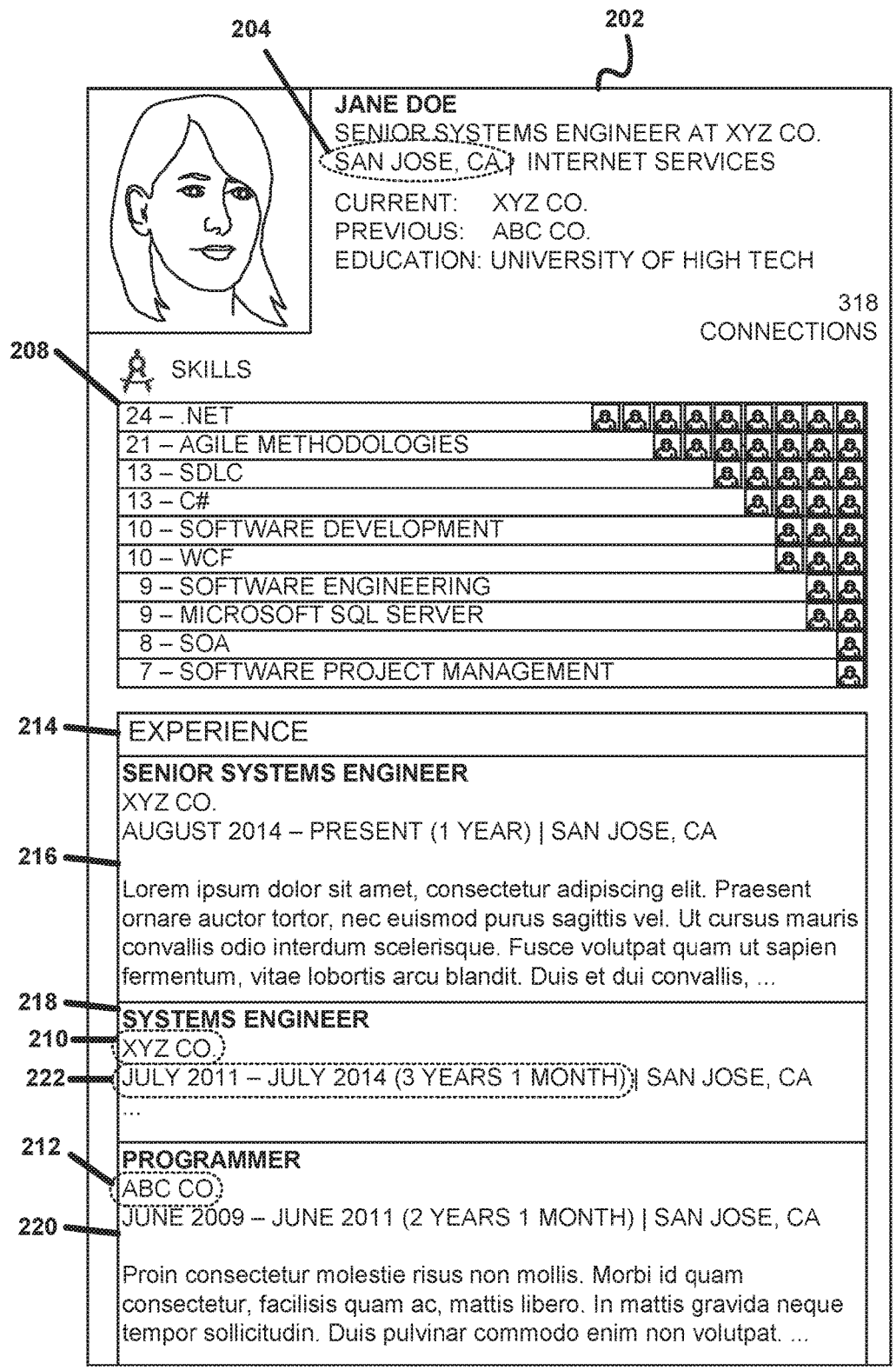
FIG. 2 is an illustration of an electronic profile of a member of a social network service, according to an example embodiment.

FIG. 2 is an illustration of an electronic profile 202 of a member of a social network service, according to an example embodiment. In addition to the member's name and picture, the example electronic profile 202 includes various information about the member, such as a current job title of the member, a geographical region 204 where the member works, an industry in which the member works, an employer with whom the member is currently employed, a previous employer with whom the member was previously employed, etc. For example, the electronic profile 202 for member "Jane Doe" illustrated in FIG. 2 lists her current job title as "Senior Systems Engineer," "San Jose, Calif." as a geographical region 204 where Jane works, "Internet Services" as an industry in which Jane works, "XYZ Co." as Jane's current employer, and "ABC Co." as Jane's previous employer. The example electronic profile 202 includes a skills section 208 that lists the skills the member possesses (or claims to possess).

The example electronic profile 202 includes an experience section 214 that describes the vocational, educational, and/or charitable experiences of the member. The experience section 214 includes one or more experience subsections; each experience subsection describes a particular experience, such as a position held with an employer. Each experience subsection includes a job title the member held during that experience, the organization for that experience, a geographical region relevant to that experience, and a description describing the experience. Each experience subsection lists a time period 222 for the experience, usually in the form of a start date, and end date, and the length of time from the start date through the end date. The experience section 214 usually lists the experience subsections in reverse chronological order. By analyzing the data included in these experience subsections, the social networking service may determine which members have switched jobs and how recently these members switched jobs.

For example, the experience section 214 of Jane Doe's example electronic profile 202 illustrated in FIG. 2 lists three experience subsections 216, 218, and 220. Experience subsection 216 describes Jane's current position as a Senior Systems Engineer at XYZ Co., experience subsection 218 describes Jane's previous position as a Systems Engineer at XYZ Co., and experience subsection 220 describes Jane's previous position as a Programmer at ABC Co. The time period for experience subsection 220 is "June 2009-June 2011," while the time period for experience subsection 218 is "July 2011-July 2014." Thus, as illustrated in FIG. 2, Jane switched jobs sometime in June or July 2011.

Figure 3:
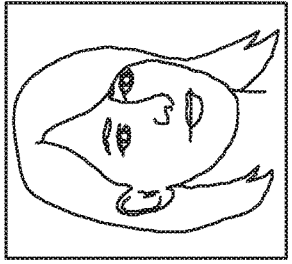
FIG. 3 illustrates a process of clustering individual skills listed on member profiles into skillsets based on similarities, according to an example embodiment.
Figure 3:
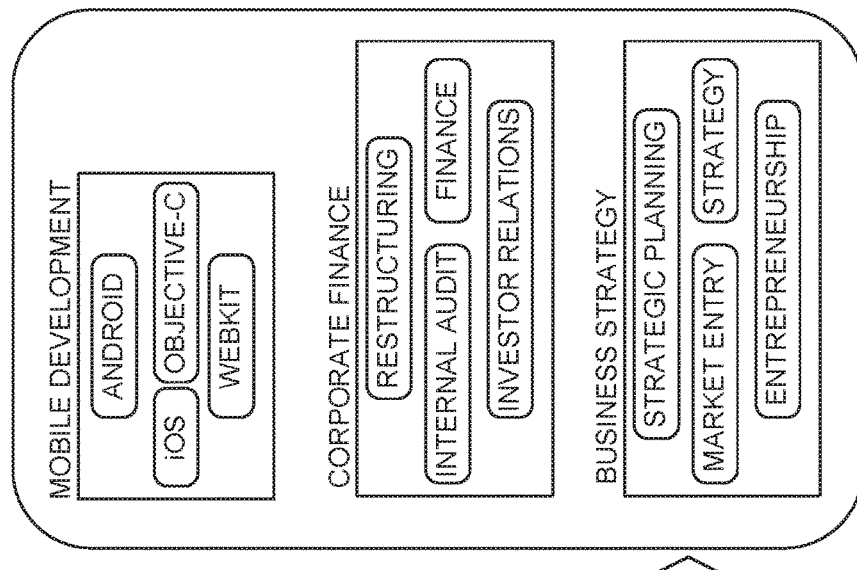
Figure 3:

FIG. 3 is an illustration 300 of grouping individual skills 302 listed on member profiles into skillsets 304 based on skill similarities, according to an example embodiment. Skill clustering based on the co-occurrences of individual skills explicitly listed on member profiles is described in U.S. Pat. No. 8,650,177, issued on Feb. 11, 2014 to Skomoroch, et al., entitled, "SKILL EXTRACTION SYSTEM." Estimating workforce skill misalignments using skill clusters rather than individual skills is less complicated and produces results that are more meaningful.

Figure 4:
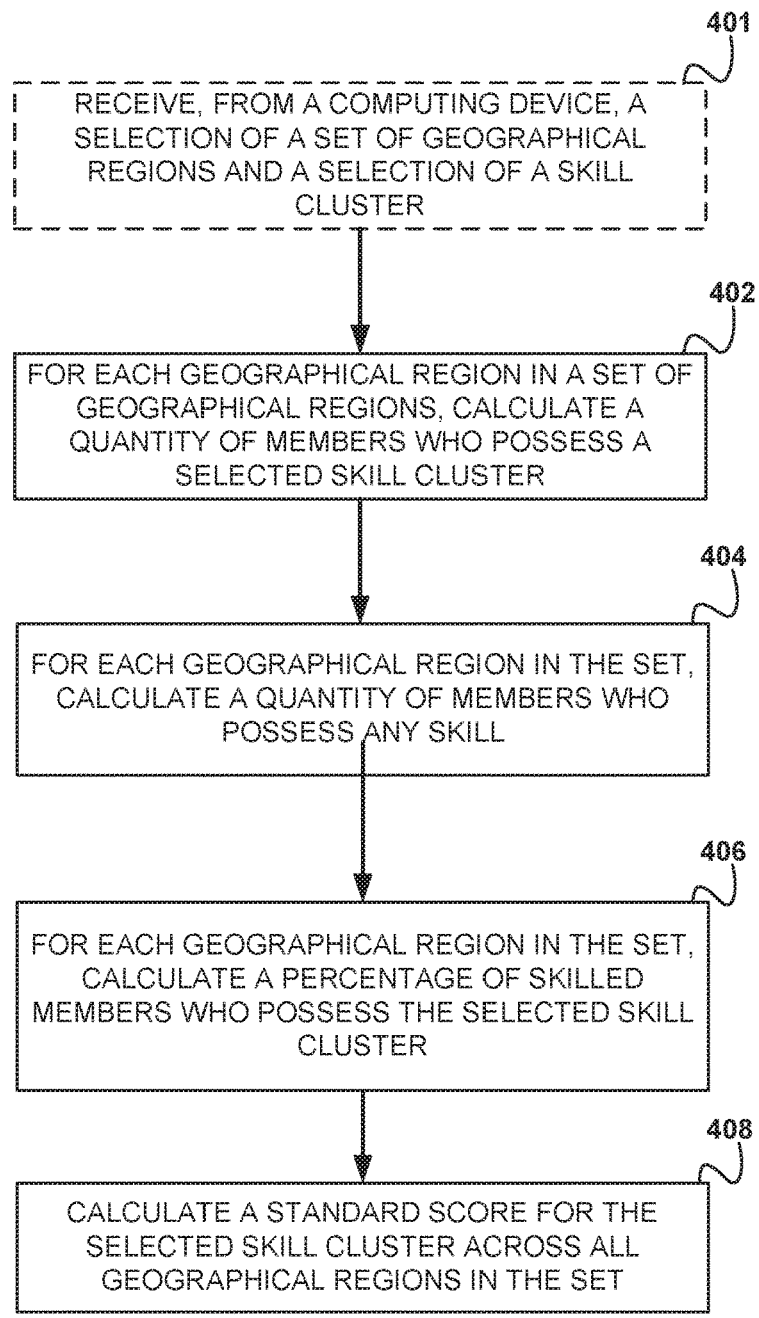
FIG. 4 is a flowchart illustrating operations of a workforce skills misalignment module performing a method for estimating demand for a skill, according to an example embodiment.

FIG. 4 is a flowchart illustrating operations of a workforce skills misalignment module 116 performing a method for estimating supply for a skill cluster, according to an example embodiment.

Optionally, a selection of a set of geographical regions and a selection of a skill cluster is received from a computing device (operation 401). In an embodiment, receiving a selection of a skill belonging to a skill cluster may be considered a selection of the skill cluster.

For each geographical region in the set of selected geographical regions, a quantity of members who possess a skill in a selected skill cluster is calculated (operation 402).

For each geographical region in the set of selected geographical regions, a quantity of members who possess any skill ("skilled members") is calculated (operation 404).

For each geographical region in the set of selected geographical regions, a percentage is calculated (operation 406) by dividing the result of operation 402 by the result of operation 404.

A standardized score (e.g., a "Z-score") for the selected skill cluster across all geographical regions in the set of selected geographical regions is calculated (operation 408). A standardized score for a raw score (x) may be calculated by subtracting the mean of a population ($\mu$) from x, then dividing by the standard deviation ($\sigma$) of the population, where the percentages for each geographical region are the population. The standardized score for the selected skill cluster represents the workforce supply for the selected skill cluster. In an embodiment, each sample in the population is a normalization of the percentage, such as a logarithm of the percentage (e.g., ln(percentage)).

Figure 5:
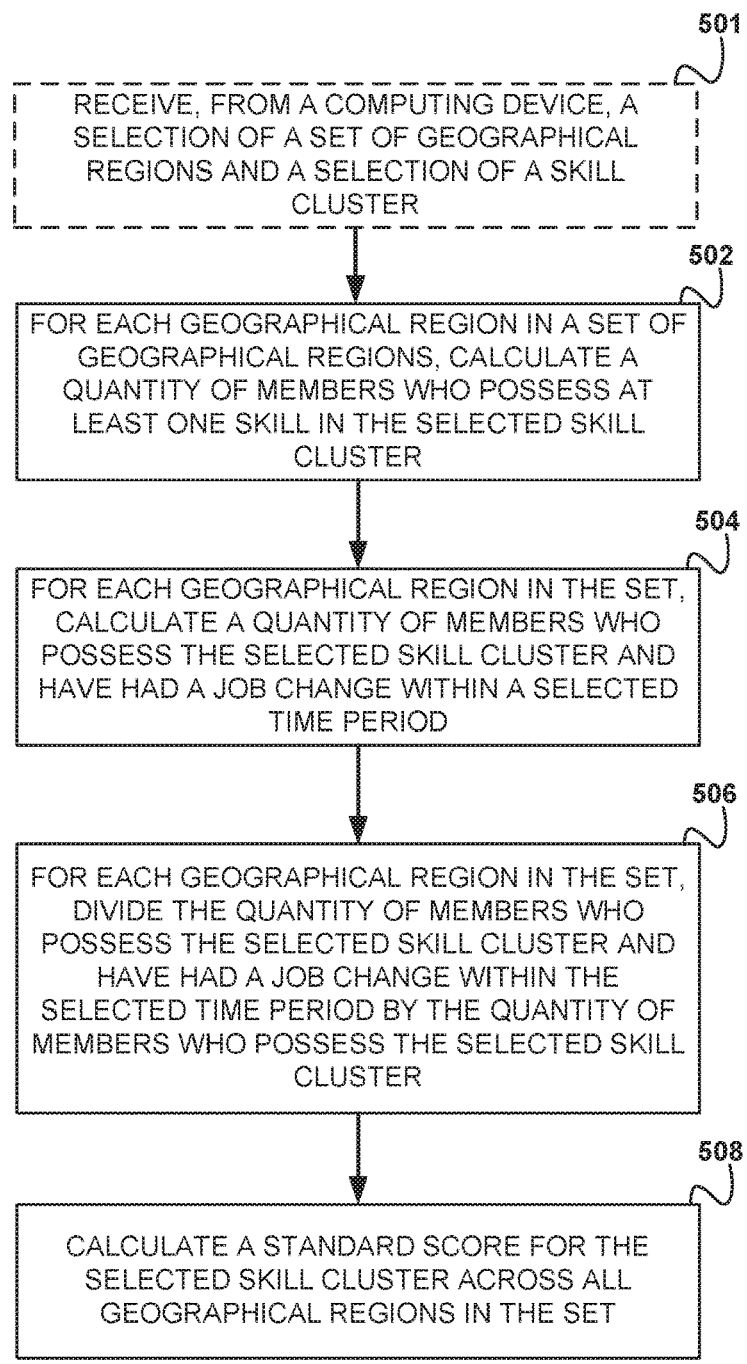
FIG. 5 is a flowchart illustrating operations of a workforce skills misalignment module performing a method for estimating supply for a skill, according to an example embodiment.

FIG. 5 is a flowchart illustrating operations of a workforce skills misalignment module 116 performing a method for estimating demand for a skill cluster, according to an example embodiment.

Optionally, a selection of a set of geographical regions and a selection of a skill cluster is received from a computing device (operation 501). In an embodiment, receiving a selection of a skill belonging to a skill cluster may be considered a selection of the skill cluster.

For each geographical region in the set of selected geographical regions, a quantity of members who possess a selected skill in a selected skill cluster is calculated (operation 502).

For each geographical region in the set of selected geographical regions, a quantity of members who possess the selected skill cluster and have switched jobs within a selected time period is calculated (operation 504).

For each geographical region in the set of selected geographical regions, a percentage is calculated by dividing (operation 506) the quantity of members who possess the selected skill cluster and have switched jobs within the selected time period (e.g., the result of operation 504) by the quantity of members who possess the selected skill cluster (e.g., the result of operation 502).

A standardized score for the selected skill cluster across all geographical regions in the set of selected geographical regions is calculated (operation 508). A standardized score for a raw score (x) may be calculated by subtracting the mean of a population ($\mu$) from x, then dividing by the standard deviation ($\sigma$) of the population, where the percentages for each geographical region are the population. This standardized score represents the workforce demand for the selected skill cluster. In an embodiment, each sample in the population is a normalization of the percentage, such as a logarithm of the percentage (e.g., ln(percentage)).

Figure 6:
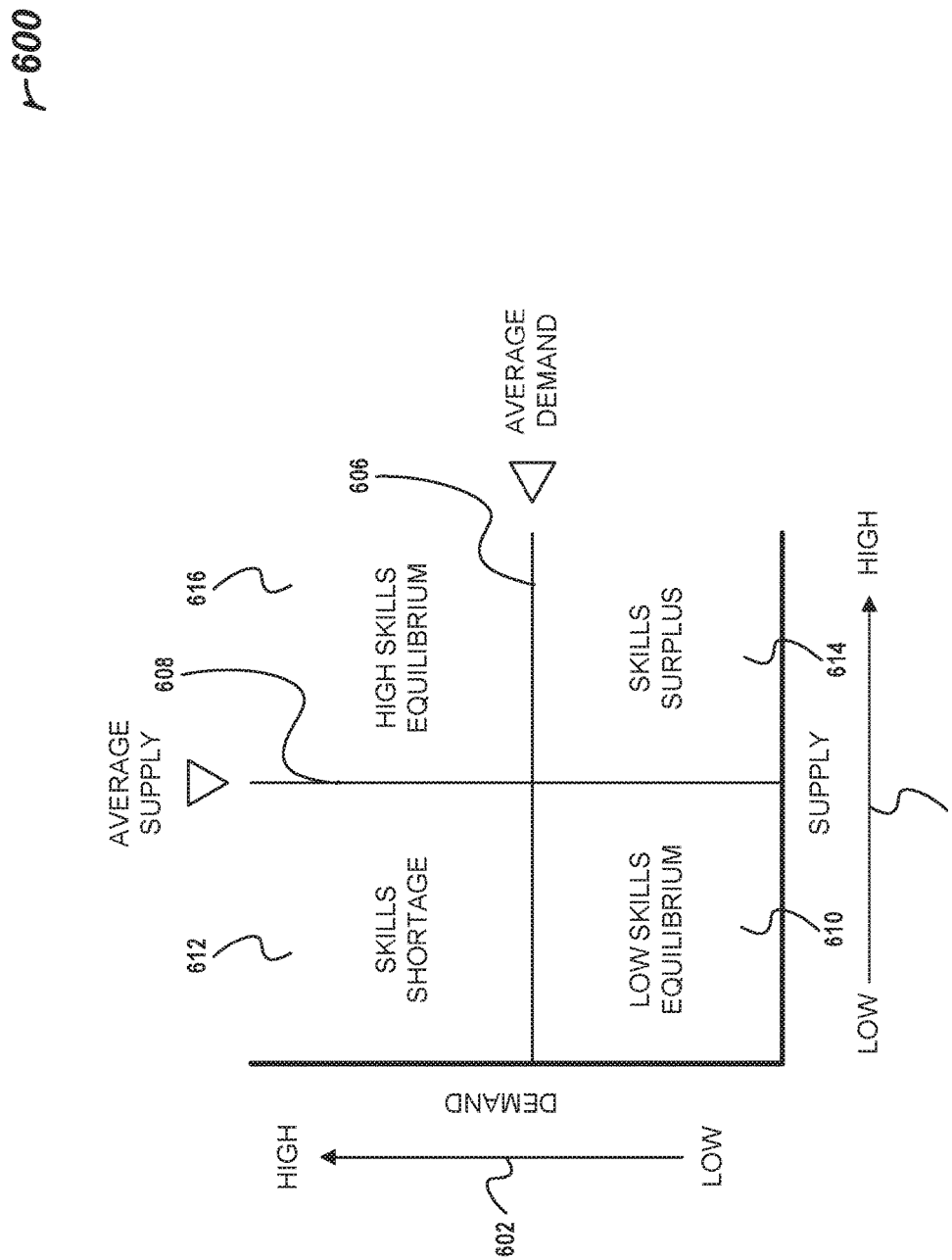
FIG. 6 is a template of a graph for visually comparing workforce skill misalignments, according to an example embodiment.

FIG. 6 is a template of a graph 600 for visually comparing workforce skill misalignments, according to an example embodiment. The Y-axis 602 indicates workforce demand for a skill cluster. "Possessing a skill cluster" is shorthand for "possessing at least one skill in a skill cluster." For a given region, workforce demand is determined by how frequently members in the region, who possess a skill within the skill cluster, switch jobs. The X-axis 604 indicates workforce supply of a skill cluster. For a given region and skill cluster, workforce demand is directly proportional to the quantity of members in the region who possess a skill within the skill cluster and how frequently those members have switched jobs.

The Y-axis midpoint 606 indicates the average workforce demand for the skill cluster among the geographic regions being compared, while the X-axis midpoint 608 indicates the average workforce supply for the skill cluster among the geographic regions being compared.

For a selected skill cluster, a point on the graph 600 for a region indicates that region's particular workforce demand/workforce supply ratio for the selected skill compared to those of the other geographic regions plotted on the graph.

If the point for a region appears in the lower left quadrant 610, the region is said to be in a "low skills equilibrium" for that skill cluster, indicating that both demand for members possessing a skill in the skill cluster and the supply of members possessing a skill in the skill cluster is low in that region.

If the point for a region appears in the upper left quadrant 612, the region is said to be in a "skills shortage" for that skill cluster, indicating that, for the given region, the demand for skills in the skill cluster is greater than the supply of members who possess a skill within the skill cluster.

If the point for a region appears in the lower right quadrant 614, the region is said to be in a "skills surplus" for that skill cluster, indicating that, for the given region, the supply of members possessing a skill in the skill cluster is greater than the demand for members who possess a skill within the skill cluster.

If the point for a region appears in the upper right quadrant 616, the region is said to be in a "high skills equilibrium" for that skill cluster, indicating that both demand for members possessing a skill in the skill cluster and the supply of members possessing a skill in the skill cluster is high in that region.

Figure 7:
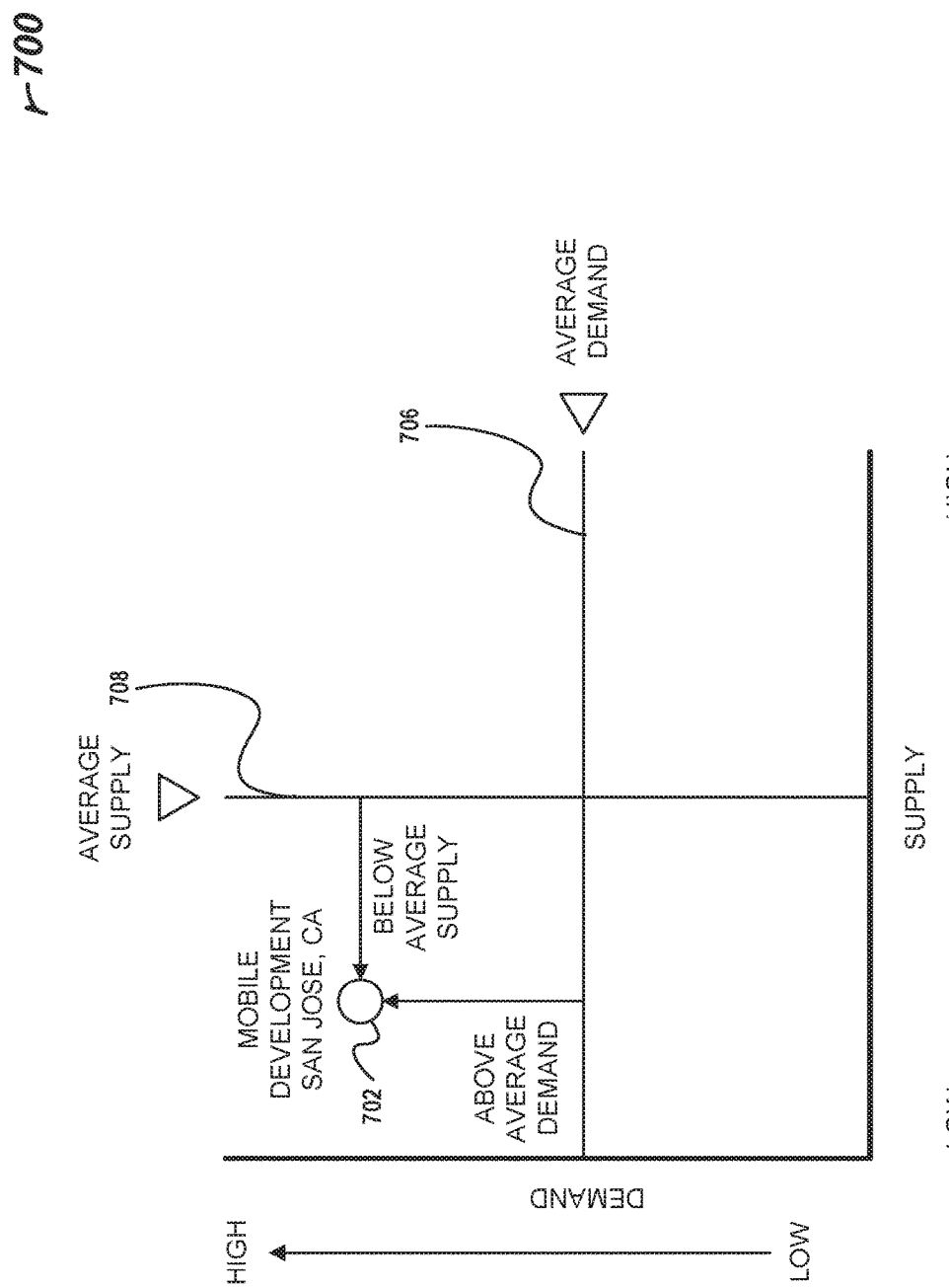
FIG. 7 is a graph illustrating a workforce skill cluster misalignment for one geographic region, according to an example embodiment.

FIG. 7 is a graph 700 illustrating a workforce skill cluster misalignment for one geographic region, according to an example embodiment. As illustrated, the point 702 representing the "mobile development" skill cluster for "San Jose, Calif." is in the upper left quadrant of graph 700, indicating a skills shortage in San Jose, Calif. for skills in the "mobile development" skill cluster.

Furthermore, compared to the points (not shown) of the other regions plotted on the graph, point 702 is above the Y-axis midpoint 706, indicating that San Jose, Calif. has above average demand for the skill cluster, and point 702 is "below" the X-axis midpoint 708, indicating that San Jose, Calif. has below average supply for the skill cluster.

Figure 8:
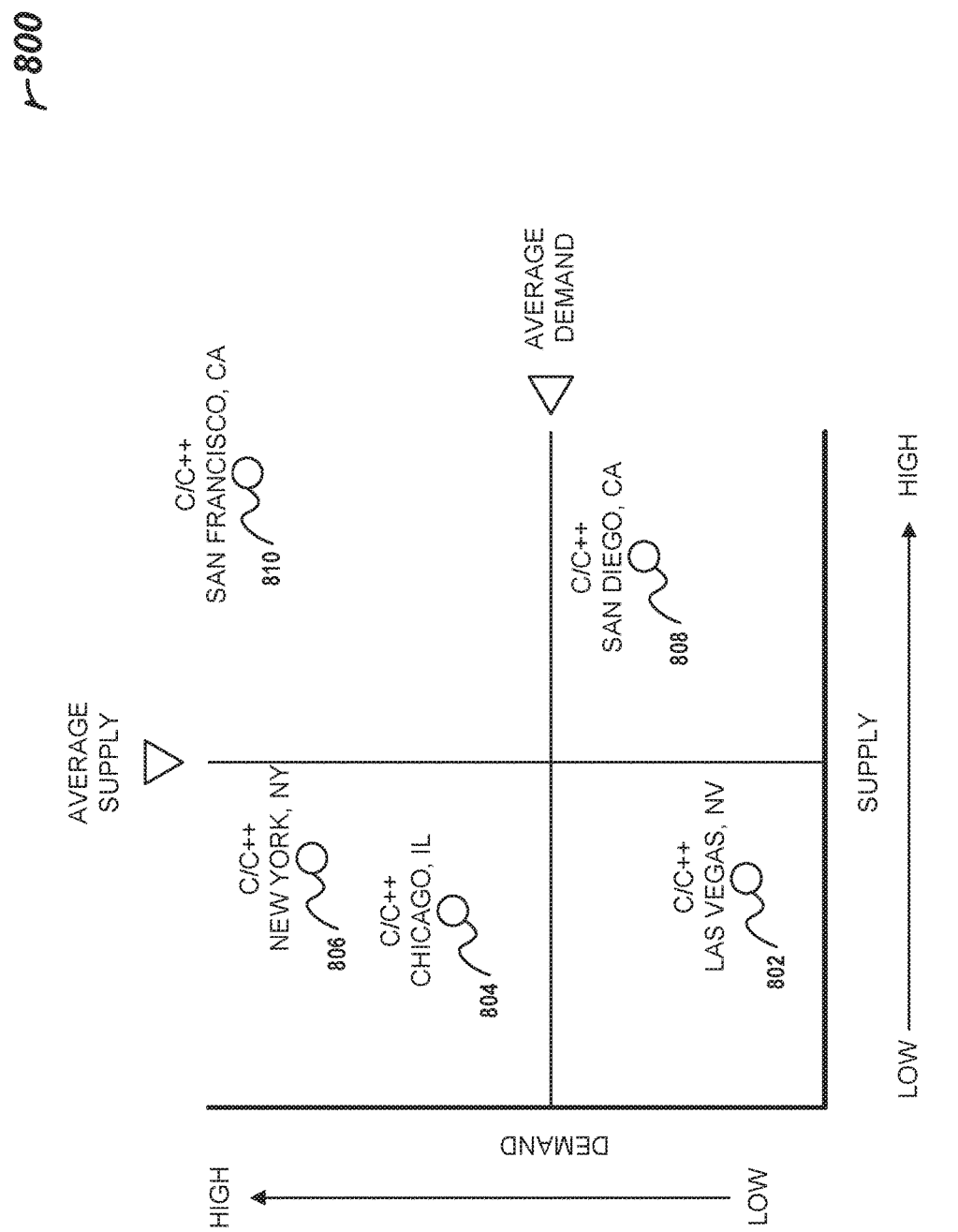
FIG. 8 is a graph comparing the workforce misalignments for a skill cluster amongst geographic regions, according to an example embodiment.

FIG. 8 is a graph 800 comparing the workforce misalignments for a skill cluster amongst geographic regions, according to an example embodiment. As illustrated in FIG. 8, the points for the "C/C++" skills cluster for five different cities have been plotted. Las Vegas, Nev. 802 is in a "low skills equilibrium" for the "C/C++" skills cluster, while San Francisco, Calif. 810 is in a "high skills equilibrium" for the "C/C++" skills cluster. Chicago, Ill. 804 and New York, N.Y. 806 are both in a "skills shortage" for the "C/C++" skills cluster, while San Diego, Calif. 808 is in a "skills surplus" for the "C/C++" skills cluster.

Visualizing the relative positions of several regions vis-à-vis a skills cluster allows the viewer to compare the workforce situations of the regions.

Figure 9:
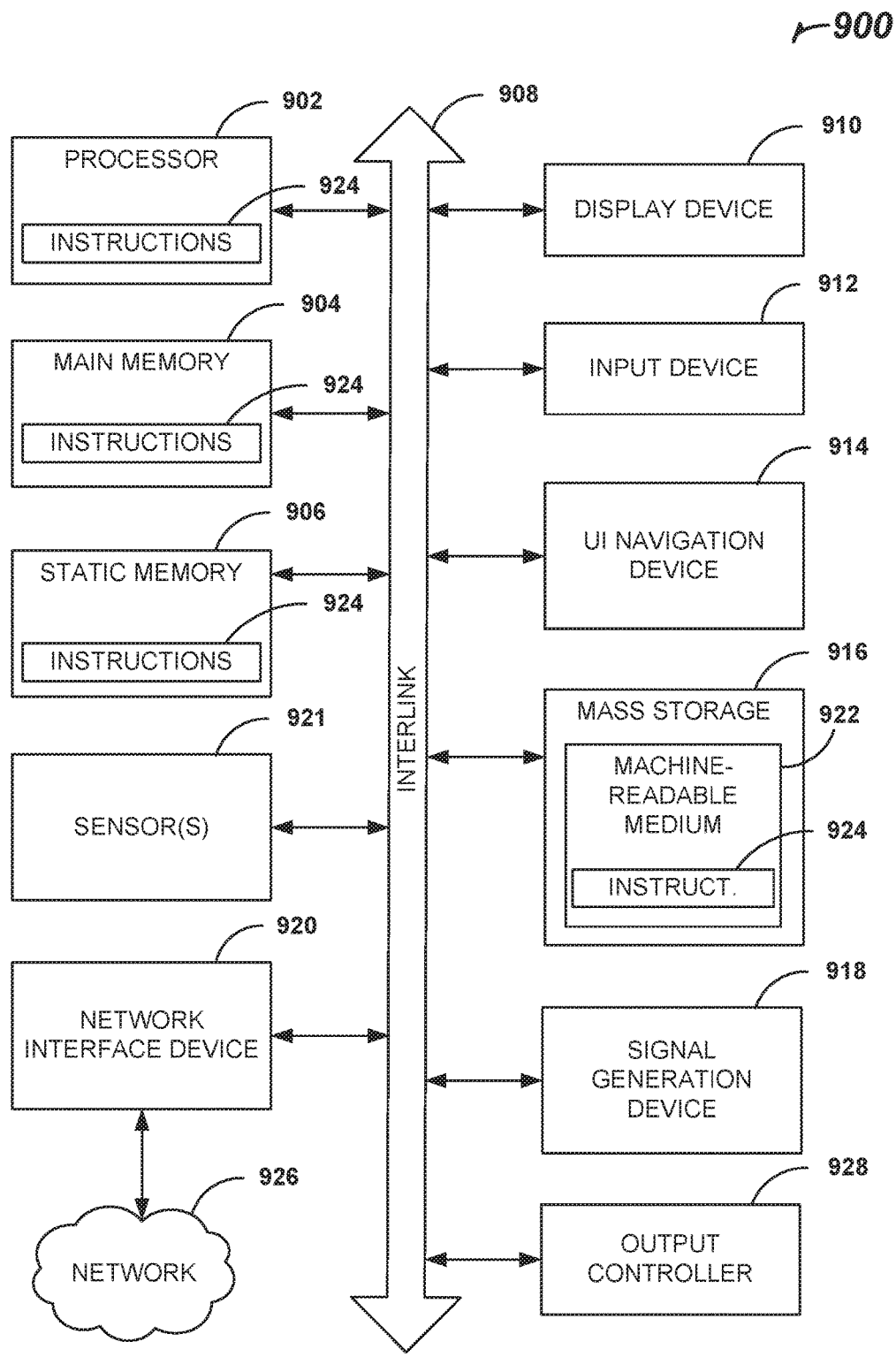
FIG. 9 is a block diagram illustrating an example of a machine, upon which any one or more example embodiments may be implemented.

FIG. 9 is a block diagram illustrating an example of a machine 900, upon which any one or more example embodiments may be implemented. In alternative embodiments, the machine 900 may operate as a standalone device or may be connected (e.g., networked) to other machines. In a networked deployment, the machine 900 may operate in the capacity of a server machine, a client machine, or both in a client-server network environment. In an example, the machine 900 may act as a peer machine in a peer-to-peer (P2P) (or other distributed) network environment. The machine 900 may implement or include any portion of the social network service from FIG. 3, and may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, although only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations, etc.

Examples, as described herein, may include, or may operate by, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, input device 912 and navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.)

The storage device 916 may include a machine-readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine-readable media.

Although the machine-readable medium 922 is illustrated as a single medium, the term "machine-readable medium" may include a single medium or multiple media (e.g., a centralized or distributed database, and/or associated caches and servers) configured to store the one or more instructions 924.

The term "machine-readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, in an embodiment, machine-readable media are not transitory propagating signals. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

The various operations of the example techniques described herein may be performed, at least partially, by one or more processors that are temporarily configured (e.g., by software instructions) or permanently configured to perform the relevant operations. Whether temporarily or permanently configured, such processors may constitute processor-implemented modules or objects that operate to perform one or more operations or functions. The modules and objects referred to herein, in some example embodiments, may comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but also deployed across a number of machines or computers. In some example embodiments, the processor or processors may be located in a single location (e.g., within a home environment, an office environment, at a server farm, etc.), while in other embodiments, the processors may be distributed across a number of locations.

The one or more processors may also operate to support performance of the relevant operations in a "cloud computing" environment or within the context of software as a service ("SaaS"). For example, at least some of the operations may be performed by a group of computers (as examples of machines including processors), these operations being accessible via a network (e.g., the Internet) and via one or more appropriate interfaces (e.g., Application Program Interfaces (APIs)).

Additional Notes and Example Embodiments

Example 1 is a method performed by an online social network having members, the method comprising: using one or more computer processors to perform operations of: receiving, from a computing device operated by a user, a selection of a set of geographical regions and a selection of a skill cluster; calculating for each respective geographical region in the selected set of geographical regions: a respective supply for the selected skill cluster as a first respective standardized score corresponding to a first respective percentage of skilled members in the respective geographical region whose respective member profile indicates possession of the selected skill cluster; a respective demand for the selected skill cluster as a second respective standardized score corresponding to a second respective percentage of job-switching members in the respective geographical region whose respective member profile indicates possession of the selected skill cluster; a respective skills misalignment for the selected skill cluster as the respective difference between the respective demand and the respective supply; generating a user interface including the calculated skills misalignments of each respective geographical region in the selected set of geographical regions; and transmitting the generated user interface to the computing device.

In Example 2, the subject matter of Example 1 optionally includes wherein to indicate possession of the selected skill cluster by a respective member includes the respective member profile listing at least one skill name of a skill belonging to the selected skill cluster.

In Example 3, the subject matter of any one or more of Examples 1-2 optionally include wherein a skilled member has a member profile on the online social network that includes at least one skill name.

In Example 4, the subject matter of any one or more of Examples 1-3 optionally include wherein a job-switching member has a member profile on the online social network that includes at least two chronologically adjacent experience sections indicating a change in employment of the job-switching member.

In Example 5, the subject matter of any one or more of Examples 1-4 optionally include wherein calculating the first respective percentage includes: determining a first set of members, a respective member in the first set having a respective member profile on the online social network listing a skill name corresponding to a skill possessed by the respective member and belonging to the selected skill cluster; determining a second set of skilled members, a respective member in the second set having a respective member profile on the online social network listing at least one skill name corresponding to a skill possessed by the respective skilled member; and calculating the first respective percentage by dividing a quantity of members in the first set by a quantity of skilled members in the second set.

In Example 6, the subject matter of any one or more of Examples 1-5 optionally include wherein calculating the second respective percentage includes: determining a first set of members, a respective member in the first set having a respective member profile on the online social network listing a skill name corresponding to a skill possessed by the respective member and belonging to the selected skill cluster; determining a second set of job-switching members, a respective job-switching member in the second set having a respective member profile listing: a skill, belonging to the selected ski it cluster, as possessed by the respective job-switching member; and a plurality of chronologically adjacent experience sections indicating a change in employment of the respective job-switching member; and calculating the second respective percentage by dividing a quantity of job-switching members in the second set by a quantity of members in the first set.

In Example 7, the subject matter of Example 6 optionally includes wherein at least two chronologically adjacent experience sections of the plurality of chronologically adjacent experience sections are within a selected period of recency.

In Example 8, the subject matter of any one or more of Examples 1-7 optionally include wherein a respective member of the online social network is in a selected geographical region upon the respective member profile of the respective member indicating the respective member either: lives, works, desires to live, or desires to work in the selected geographical region.

Example 9 is a social networking system comprising: a machine including a processor; and a machine-readable medium comprising machine-readable instructions that, when executed by the machine, cause the machine to: receive, from a computing device operated by a user, a selection of a set of geographical regions and a selection of a skill cluster; calculate for each respective geographical region in the selected set of geographical regions: a respective supply for the selected skill cluster as a first respective standardized score corresponding to a first respective percentage of skilled members in the respective geographical region whose respective member profile indicates possession of the selected skill cluster; a respective demand for the selected skill cluster as a second respective standardized score corresponding to a second respective percentage of job-switching members in the respective geographical region whose respective member profile indicates possession of the selected skill cluster; a respective skills misalignment for the selected skill cluster as the respective difference between the respective demand and the respective supply; generate a user interface including the calculated skills misalignments of each respective geographical region in the selected set of geographical regions; and transmit the generated user interface to the computing device.

In Example 10, the subject matter of Example 9 optionally includes wherein to indicate possession of the selected skill cluster by a respective member includes the respective member profile listing at least one skill name of a skill belonging to the selected skill cluster.

In Example 11, the subject matter of any one or more of Examples 9-10 optionally include wherein a ski lied member has a member profile on the online social network that includes at least one skill name.

In Example 12, the subject matter of any one or more of Examples 9-11 optionally include wherein a job-switching member has a member profile on the online social network that includes at least two chronologically adjacent experience sections indicating a change in employment of the job-switching member.

In Example 13, the subject matter of any one or more of Examples 9-12 optionally include wherein to calculate the first respective percentage includes to: determine a first set of members, a respective member in the first set having a respective member profile on the online social network listing a skill name corresponding to a skill possessed by the respective member and belonging to the selected skill cluster; determine a second set of skilled members, a respective member in the second set having a respective member profile on the online social network listing at least one skill name corresponding to a skill possessed by the respective skilled member; and calculate the first respective percentage by dividing a quantity of members in the first set by a quantity of skilled members in the second set.

In Example 14, the subject matter of any one or more of Examples 9-13 optionally include wherein to calculate the second respective percentage includes to: determine a first set of members, a respective member in the first set having a respective member profile on the online social network listing a skill name corresponding to a skill possessed by the respective member and belonging to the selected skill cluster; determine a second set of job-switching members, a respective job-switching member in the second set having a respective member profile listing: a skill, belonging to the selected skill cluster, as possessed by the respective job-switching member; and a plurality of chronologically adjacent experience sections indicating a change in employment of the respective job-switching member; and calculate the second respective percentage by dividing a quantity of job-switching members in the second set by a quantity of members in the first set.

In Example 15, the subject matter of Example 14 optionally includes wherein at least two chronologically adjacent experience sections of the plurality of chronologically adjacent experience sections are within a selected period of recency.

In Example 16, the subject matter of any one or more of Examples 9-15 optionally include wherein a respective member of the online social network is in a selected geographical region upon the respective member profile of the respective member indicating the respective member either: lives, works, desires to live, or desires to work in the selected geographical region.

Example 17 is a machine-readable storage medium comprising instructions that, when executed by a processor of a machine, cause the machine to: receive, from a computing device operated by a user, a selection of a set of geographical regions and a selection of a skill cluster; calculate for each respective geographical region in the selected set of geographical regions: a respective supply for the selected skill cluster as a first respective standardized score corresponding to a first respective percentage of skilled members in the respective geographical region whose respective member profile indicates possession of the selected skill cluster; a respective demand for the selected skill cluster as a second respective standardized score corresponding to a second respective percentage of job-switching members in the respective geographical region whose respective member profile indicates possession of the selected skill cluster; a respective skills misalignment for the selected skill cluster as the respective difference between the respective demand and the respective supply; generate a user interface including the calculated skills misalignments of each respective geographical region in the selected set of geographical regions; and transmit the generated user interface to the computing device.

In Example 18, the subject matter of Example 17 optionally includes wherein to indicate possession of the selected skill cluster by a respective member includes the respective member profile listing at least one skill name of a skill belonging to the selected skill cluster.

In Example 19, the subject matter of any one or more of Examples 17-18 optionally include wherein a skilled member has a member profile on the online social network that includes at least one skill name.

In Example 20, the subject matter of any one or more of Examples 17-19 optionally include wherein a job-switching member has a member profile on the online social network that includes at least two chronologically adjacent experience sections indicating a change in employment of the job-switching member.

In Example 21, the subject matter of any one or more of Examples 17-20 optionally include wherein to calculate the first respective percentage includes to: determine a first set of members, a respective member in the first set having a respective member profile on the online social network listing a skill name corresponding to a skill possessed by the respective member and belonging to the selected skill cluster; determine a second set of skilled members, a respective member in the second set having a respective member profile on the online social network listing at least one skill name corresponding to a skill possessed by the respective skilled member; and calculate the first respective percentage by dividing a quantity of members in the first set by a quantity of skilled members in the second set.

In Example 22, the subject matter of any one or more of Examples 17-21 optionally include wherein to calculate the second respective percentage includes to: determine a first set of members, a respective member in the first set having a respective member profile on the online social network listing a skill name corresponding to a skill possessed by the respective member and belonging to the selected skill cluster; determine a second set of job-switching members, a respective job-switching member in the second set having a respective member profile listing: a skill, belonging to the selected skill cluster, as possessed by the respective job-switching member; and a plurality of chronologically adjacent experience sections indicating a change in employment of the respective job-switching member; and calculate the second respective percentage by dividing a quantity of job-switching members in the second set by a quantity of members in the first set.

In Example 23, the subject matter of Example 22 optionally includes wherein at least two chronologically adjacent experience sections of the plurality of chronologically adjacent experience sections are within a selected period of recency.

In Example 24, the subject matter of any one or more of Examples 17-23 optionally include wherein a respective member of the online social network is in a selected geographical region upon the respective member profile of the respective member indicating the respective member either: lives, works, desires to live, or desires to work in the selected geographical region.

Conventional terms in the fields of computer networking and computer systems have been used herein. The terms are known in the art and are provided only as a non-limiting example for convenience purposes. Accordingly, the interpretation of the corresponding terms in the claims, unless stated otherwise, is not limited to any particular definition.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. Moreover, in the following claims, the terms "first," "second," and "third," etc., are used merely as labels, and are not intended to impose numerical requirements on their objects.

What is claimed is:

1. A method performed by an online social network having members, the method comprising:
   using one or more computer processors to perform operations of:
   receiving, from a computing device operated by a user, a selection of a set of geographical regions and a selection of a skill cluster;
   calculating for each respective geographical region in the selected set of geographical regions:
   a respective supply for the selected skill cluster as a first respective standardized score corresponding to a first respective percentage of skilled members in the respective geographical region whose respective member profile indicates possession of the selected skill cluster;

a respective demand for the selected skill cluster as a second respective standardized score corresponding to a second respective percentage of job-switching members in the respective geographical region whose respective member profile indicates possession of the selected skill cluster;

a respective skills misalignment for the selected skill cluster as the respective difference between the respective demand and the respective supply;

generating a user interface including the calculated skills misalignments of each respective geographical region in the selected set of geographical regions; and transmitting the generated user interface to the computing device;

wherein the user interface comprises a multi-quadrant graph; and wherein the skills misalignment of each respective geographic region is represented by a quadrant in which a ratio of the respective supply and the respective demand is located, thereby permitting a comparison of ratios of the respective supply and the respective demand for each respective geographical region.

2. The method of claim 1, wherein to indicate possession of the selected skill cluster by a respective member includes the respective member profile listing at least one skill name of a skill belonging to the selected skill cluster.

3. The method of claim 1, wherein a skilled member has a member profile on the online social network that includes at least one skill name.

4. The method of claim 1, wherein a job-switching member has a member profile on the online social network that includes at least two chronologically adjacent experience sections indicating a change in employment of the job-switching member.

5. The method of claim 1, wherein calculating the first respective percentage includes:
   determining a first set of members, a respective member in the first set having a respective member profile on the online social network listing a skill name corresponding to a skill possessed by the respective member and belonging to the selected skill cluster;
   determining a second set of skilled members, a respective member in the second set having a respective member profile on the online social network listing at least one skill name corresponding to a skill possessed by the respective skilled member; and
   calculating the first respective percentage by dividing a quantity of members in the first set by a quantity of skilled members in the second set.

6. The method of claim 1, wherein calculating the second respective percentage includes:
   determining a first set of members, a respective member in the first set having a respective member profile on the online social network listing a skill name corresponding to a skill possessed by the respective member and belonging to the selected skill cluster;
   determining a second set of job-switching members, a respective job-switching member in the second set having a respective member profile listing:
   a skill, belonging to the selected skill cluster, as possessed by the respective job-switching member; and
   a plurality of chronologically adjacent experience sections indicating a change in employment of the respective job-switching member; and
   calculating the second respective percentage by dividing a quantity of job-switching members in the second set by a quantity of members in the first set.

7. The method of claim 6, wherein at least two chronologically adjacent experience sections of the plurality of chronologically adjacent experience sections are within a selected period of recency.

8. The method of claim 1, wherein a respective member of the online social network is in a selected geographical region upon the respective member profile of the respective member indicating the respective member either: lives, works, desires to live, or desires to work in the selected geographical region.

9. A social networking system comprising:
   a machine including a processor; and
   a machine-readable medium comprising machine-readable instructions that, when executed by the machine, cause the machine to:
   receive, from a computing device operated by a user, a selection of a set of geographical regions and a selection of a skill cluster;
   calculate for each respective geographical region in the selected set of geographical regions:
   a respective supply for the selected skill cluster as a first respective standardized score corresponding to a first respective percentage of skilled members in the respective geographical region whose respective member profile indicates possession of the selected skill cluster;
   a respective demand for the selected skill cluster as a second respective standardized score corresponding to a second respective percentage of job-switching members in the respective geographical region whose respective member profile indicates possession of the selected skill cluster;
   a respective skills misalignment for the selected skill cluster as the respective difference between the respective demand and the respective supply;
   generate a user interface including the calculated skills misalignments of each respective geographical region in the selected set of geographical regions; and
   transmit the generated user interface to the computing device.

10. The social networking system of claim 9, wherein to indicate possession of the selected skill cluster by a respective member includes the respective member profile listing at least one skill name of a skill belonging to the selected skill cluster.

11. The social networking system of claim 9, wherein a skilled member has a member profile on the online social network that includes at least one skill name.

12. The social networking system of claim 9, wherein a job-switching member has a member profile on the online social network that includes at least two chronologically adjacent experience sections indicating a change in employment of the job-switching member.

13. The social networking system of claim 9, wherein to calculate the first respective percentage includes to:
   determine a first set of members, a respective member in the first set having a respective member profile on the online social network listing a skill name corresponding to a skill possessed by the respective member and belonging to the selected skill cluster;
   determine a second set of skilled members, a respective member in the second set having a respective member profile on the online social network listing at least one skill name corresponding to a skill possessed by the respective skilled member; and
   calculate the first respective percentage by dividing a quantity of members in the first set by a quantity of skilled members in the second set.

14. The social networking system of claim 9, wherein to calculate the second respective percentage includes to:
  determine a first set of members, a respective member in the first set having a respective member profile on the online social network listing a skill name corresponding to a skill possessed by the respective member and belonging to the selected skill cluster;
  determine a second set of job-switching members, a respective job-switching member in the second set having a respective member profile listing:
  a skill, belonging to the selected skill cluster, as possessed by the respective job-switching member; and
  a plurality of chronologically adjacent experience sections indicating a change in employment of the respective job-switching member; and
  calculate the second respective percentage by dividing a quantity of job-switching members in the second set by a quantity of members in the first set.

15. The social networking system of claim 14, wherein at least two chronologically adjacent experience sections of the plurality of chronologically adjacent experience sections are within a selected period of recency.

16. The social networking system of claim 9, wherein a respective member of the online social network is in a selected geographical region upon the respective member profile of the respective member indicating the respective member either: lives, works, desires to live, or desires to work in the selected geographical region.

17. A machine-readable storage medium comprising instructions that, when executed by a processor of a machine, cause the machine to:
  receive, from a computing device operated by a user, a selection of a set of geographical regions and a selection of a skill cluster;
  calculate for each respective geographical region in the selected set of geographical regions:
  a respective supply for the selected skill cluster as a first respective standardized score corresponding to a first respective percentage of skilled members in the respective geographical region whose respective member profile indicates possession of the selected skill cluster;
  a respective demand for the selected skill cluster as a second respective standardized score corresponding to a second respective percentage of job-switching members in the respective geographical region whose respective member profile indicates possession of the selected skill cluster;
  a respective skills misalignment for the selected skill cluster as the respective difference between the respective demand and the respective supply;
  generate a user interface including the calculated skills misalignments of each respective geographical region in the selected set of geographical regions; and
  transmit the generated user interface to the computing device.

18. The machine-readable storage medium of claim 17, wherein to indicate possession of the selected skill cluster by a respective member includes the respective member profile listing at least one skill name of a skill belonging to the selected skill cluster.

19. The machine-readable storage medium of claim 17, wherein a skilled member has a member profile on the online social network that includes at least one skill name.

20. The machine-readable storage medium of claim 17, wherein a job-switching member has a member profile on the online social network that includes at least two chronologically adjacent experience sections indicating a change in employment of the job-switching member.

21. The machine-readable storage medium of claim 17, wherein to calculate the first respective percentage includes to:
  determine a first set of members, a respective member in the first set having a respective member profile on the online social network listing a skill name corresponding to a skill possessed by the respective member and belonging to the selected skill cluster;
  determine a second set of skilled members, a respective member in the second set having a respective member profile on the online social network listing at least one skill name corresponding to a skill possessed by the respective skilled member; and
  calculate the first respective percentage by dividing a quantity of members in the first set by a quantity of skilled members in the second set.

22. The machine-readable storage medium of claim 17, wherein to calculate the second respective percentage includes to:
  determine a first set of members, a respective member in the first set having a respective member profile on the online social network listing a skill name corresponding to a skill possessed by the respective member and belonging to the selected skill cluster;
  determine a second set of job-switching members, a respective job-switching member in the second set having a respective member profile listing:
  a skill, belonging to the selected skill cluster, as possessed by the respective job-switching member; and
  a plurality of chronologically adjacent experience sections indicating a change in employment of the respective job-switching member; and
  calculate the second respective percentage by dividing a quantity of job-switching members in the second set by a quantity of members in the first set.

23. The machine-readable storage medium of claim 22, wherein at least two chronologically adjacent experience sections of the plurality of chronologically adjacent experience sections are within a selected period of recency.

24. The machine-readable storage medium of claim 17, wherein a respective member of the online social network is in a selected geographical region upon the respective member profile of the respective member indicating the respective member either: lives, works, desires to live, or desires to work in the selected geographical region.

* * * * *